(12) United States Patent
Yoshida et al.

(10) Patent No.: US 9,275,453 B2
(45) Date of Patent: Mar. 1, 2016

(54) IMAGE PROCESSING DEVICE AND IMAGE PROCESSING METHOD

(75) Inventors: Hanae Yoshida, Tokyo (JP); Michio Oikawa, Tokyo (JP)

(73) Assignee: HITACHI, LTD., Tokyo (JP)

(*) Notice: Subject to any disclaimer, the term of this patent is extended or adjusted under 35 U.S.C. 154(b) by 16 days.

(21) Appl. No.: 14/349,453

(22) PCT Filed: Oct. 3, 2011

(86) PCT No.: PCT/JP2011/005566
§ 371 (c)(1),
(2), (4) Date: May 5, 2014

(87) PCT Pub. No.: WO2013/051045
PCT Pub. Date: Apr. 11, 2013

(65) Prior Publication Data
US 2014/0286551 A1    Sep. 25, 2014

(51) Int. Cl.
*G06K 9/00* (2006.01)
*G06T 7/00* (2006.01)
*G06T 19/00* (2011.01)

(52) U.S. Cl.
CPC ............ *G06T 7/0012* (2013.01); *G06T 7/0083* (2013.01); *G06T 19/00* (2013.01); *G06T 2210/41* (2013.01); *G06T 2219/008* (2013.01)

(58) Field of Classification Search
None
See application file for complete search history.

(56) References Cited

U.S. PATENT DOCUMENTS

| 5,497,776 | A * | 3/1996 | Yamazaki et al. | 600/445 |
| 2002/0102023 | A1 * | 8/2002 | Yamauchi | 382/199 |
| 2008/0114244 | A1 * | 5/2008 | Murashita et al. | 600/443 |
| 2008/0170768 | A1 | 7/2008 | Matsumoto | |
| 2008/0267481 | A1 * | 10/2008 | Nakamura | 382/131 |
| 2009/0080742 | A1 * | 3/2009 | Moriya | 382/131 |
| 2009/0290769 | A1 | 11/2009 | Matsumoto | |
| 2011/0164064 | A1 * | 7/2011 | Tanaka et al. | 345/667 |

FOREIGN PATENT DOCUMENTS

| JP | 4-183436 | A | 6/1992 |
| JP | 8-166995 | A | 6/1996 |
| JP | 9-35043 | A | 2/1997 |
| JP | 2008-173167 | A | 7/2008 |
| JP | 2009-72432 | A | 4/2009 |
| JP | 2009-75846 | A | 4/2009 |
| JP | 4394127 | B2 | 10/2009 |

(Continued)

*Primary Examiner* — Sumati Lefkowitz
*Assistant Examiner* — Carol Wang
(74) *Attorney, Agent, or Firm* — Baker Botts L.L.P.

(57) ABSTRACT

An image processing device includes an extraction process executing unit that extracts a 3-dimensional initial region satisfying a predetermined condition from the volume data, a region correction process executing unit that extracts a 3-dimensional corrected region by performing a correction process on the initial region, and a visualization process executing unit that generates a plurality of cross-sectional diagrams of the 3-dimensional image from the volume data and outputs at least some of the plurality of cross-sectional diagrams. When the initial region is displayed, one or more cross-sectional diagrams having voxels in the initial region are outputted so that the voxels included in the initial region are distinguishable from other regions. When the corrected region is displayed, one or more cross-sectional diagrams having voxels in the corrected region are outputted so that the voxels included in the corrected region are distinguishable from other regions.

10 Claims, 6 Drawing Sheets

(56) References Cited

FOREIGN PATENT DOCUMENTS

| JP | 2009-279206 A | 12/2009 |
| JP | 4444346 B2 | 1/2010 |
| JP | 2011-104027 A | 6/2011 |

* cited by examiner

FIG. 4
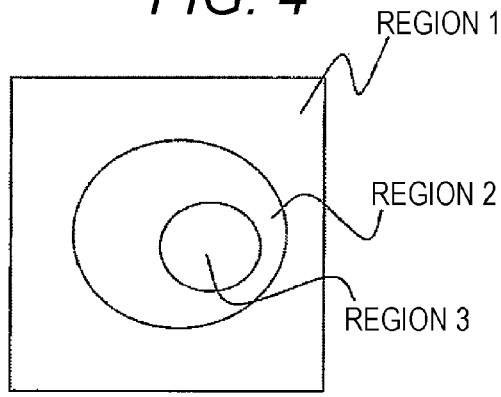
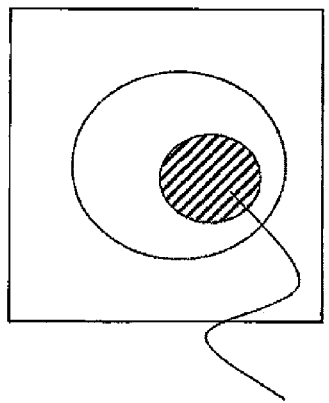
INITIAL REGION A
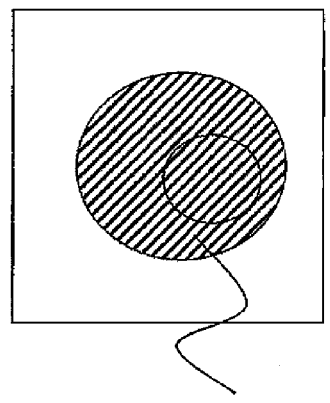
CORRECTED REGION A
FIG. 5
|  | PARAMETER 1 | PARAMETER 2 | PARAMETER 3 | ... |
|---|---|---|---|---|
| INITIAL PARAMETER | $X_1$ | $X_2$ | $X_3$ | ... |
| CORRECTION THRESHOLD VALUE A | $A_1$ | $A_2$ | $A_3$ | |
| CORRECTION THRESHOLD VALUE B | $B_1$ | $B_2$ | $B_3$ | |
| ... | ... | | | |

FIG. 6

| | PARAMETER 1 | PARAMETER 2 | PARAMETER 3 | ... |
|---|---|---|---|---|
| INITIAL PARAMETER | $X_1$ | $X_2$ | $X_3$ | ... |
| CORRECTION THRESHOLD VALUE A | $A_1=f_1(X_1)$ | $A_2=f_2(X_2)$ | $A_3=f_3(X_3)$ | ... |
| CORRECTION THRESHOLD VALUE B | $f'_1(A_1)$ | $f'_2(A_2)$ | $f'_3(A_3)$ | ... |
| ... | ... | ... | ... | ... |

FIG. 7

| | CONVERGENCE CONDITION | CORRECTION ITEM 1 | | CORRECTION ITEM 2 | | ... |
|---|---|---|---|---|---|---|
| | | CHANGE PARAMETER | CONDITION | CHANGE PARAMETER | CONDITION | ... |
| PROCESS A | EITHER ONE | X, INCREASE | t TIMES OR MORE AND u TIMES OR LESS BY VOLUME | Y, DECREASE | v TIMES OR MORE AND w TIMES OR LESS IN MAJOR DIAMETER | |
| ... | | ... | ... | ... | ... | ... |
| ... | | ... | ... | ... | ... | ... |

INITIAL REGION B

REGION DURING CORRECTION

CORRECTED REGION A

CORRECTED REGION A

CORRECTED REGION B

CORRECTED REGION C

IMAGE PROCESSING DEVICE AND IMAGE PROCESSING METHOD

TECHNICAL FIELD

The present invention relates to an image processing technology for manually correcting a 3-dimensional region set in 3-dimensional volume data.

BACKGROUND ART

In diagnosis using a medical image inspection device typified by an X-ray CT (X-ray Computed Tomography) device or an MRI (Magnetic Resonance Imaging) device, a visualization process is executed on a captured 3-dimensional medical image (hereinafter also referred to as "medical image volume data") using a plurality of medical image processing algorithms and an obtained result is used as diagnosis assistance in some cases. In regard to the medical image processing algorithms used here, there are a plurality of classifications of processing methods according to, for example, cases in which only data of a necessary tissue part is extracted from input medical image volume data for display and in which an edge of an image is emphasized and displayed.

Here, when a medical image processing algorithm is automatically applied and an image is displayed, it is very difficult to automatically apply all of the processes in consideration of safety or accuracy, and finally it is necessary for a doctor or an engineer to execute confirmation or correction in most cases. However, with recent advance in technologies of medical image capturing devices, the number of tomographic images (hereinafter also referred to as "slice images") which can be acquired once has been increased at an accelerated pace, and thus an amount of medical image volume data output as a photography result is considerable. Thus, when the amount of medical image volume data is considerable, the above-mentioned work of executing the confirmation and correction by humans is particularly very expensive in terms of a load imposed on a doctor or an engineer or human cost. In order to reduce such a load, accuracy and validity of a portion subjected to automatic processing are required to be improved as much as possible, and simultaneously to improve simplicity or efficiency of a portion subjected to manual processing is also an important task nowadays.

PTL 1 discloses a method of correcting a contour line of a 3-dimensional region into a free curve, and specifically, a method of reflecting a movement distance and a movement time of a pointing device to correction of a curve.

PTL 2 suggests a method of setting a guide region separately apart from a region desired to be extracted and performing correction on the extracted region so as to enter the range of the guide region.

CITATION LIST

Patent Literature

PTL 1: U.S. Pat. No. 4,444,346
PTL 2: U.S. Pat. No. 4,394,127

SUMMARY OF INVENTION

Technical Problem

When an automatically extracted region is further corrected manually, technologies which have been suggested ever as methods of executing manual correction simply have the following problems. That is, the technologies have problems in that even in a case where a plurality of points desired to be corrected are present on a contour line, the points can be corrected only one by one; there is a possibility of a corrected curve (contour line) becoming considerably different from original image information since the curve is corrected into a free curve; the amount of data may be increased according to the amount of correction points in a case where a progress of change is stored; and a region serving as a guide has to be set in addition to an extraction target region.

Accordingly, it is demanded to provide an image processing method, an image processing device, and a program capable of executing correction as simply as possible when manual correction is executed on a 3-dimensional region.

Solution to Problem

An image processing device executing image processing on volume data of a 3-dimensional image includes: an extraction process executing unit that extracts a 3-dimensional initial region satisfying a condition given in advance from the volume data; a region correction process executing unit that extracts a 3-dimensional corrected region by performing a correction process on the initial region; and a visualization process executing unit that generates a plurality of cross-sectional diagrams of the 3-dimensional image from the volume data and outputs at least some of the plurality of cross-sectional diagrams.

When the initial region is displayed, the visualization process executing unit selects one or more cross-sectional diagrams having voxels included in the initial region from the plurality of cross-sectional diagrams generated by the visualization process executing unit, and outputs the selected one or more cross-sectional diagrams so that the voxels included in the initial region are distinguishable from other regions.

When the corrected region is displayed, the visualization process executing unit selects one or more cross-sectional diagrams having voxels included in the corrected region from the plurality of cross-sectional diagrams generated by the visualization process executing unit, and outputs the selected one or more cross-sectional diagrams so that the voxels included in the corrected region are distinguishable from other regions.

Advantageous Effects of Invention

It is possible to execute correction on a 3-dimensional region of interest extracted automatically from 3-dimensional volume data in a simple manner and in a short time.

BRIEF DESCRIPTION OF DRAWINGS

FIG. 4 is an image diagram illustrating an example of a region corrected from an initial region extracted by an automatic extraction process executing unit 34 by changing a parameter of an extraction algorithm by a region correction process executing unit 32.

FIG. 5 is a parameter table stored in the region correction process executing unit 32 and is table illustrating an example of a case in which the values of parameters themselves are set.

FIG. 6 is a parameter table stored in the region correction process executing unit 32 and is a table illustrating an example of a case in which the values of parameters are set in the forms of formulae.

FIG. 7 is a table illustrating an example of a correction process item table stored in the region correction process executing unit 32.

DESCRIPTION OF EMBODIMENTS

Hereinafter, an image processing device, an image processing method, and a program will be described in detail with reference to the drawings.

Figure 1:
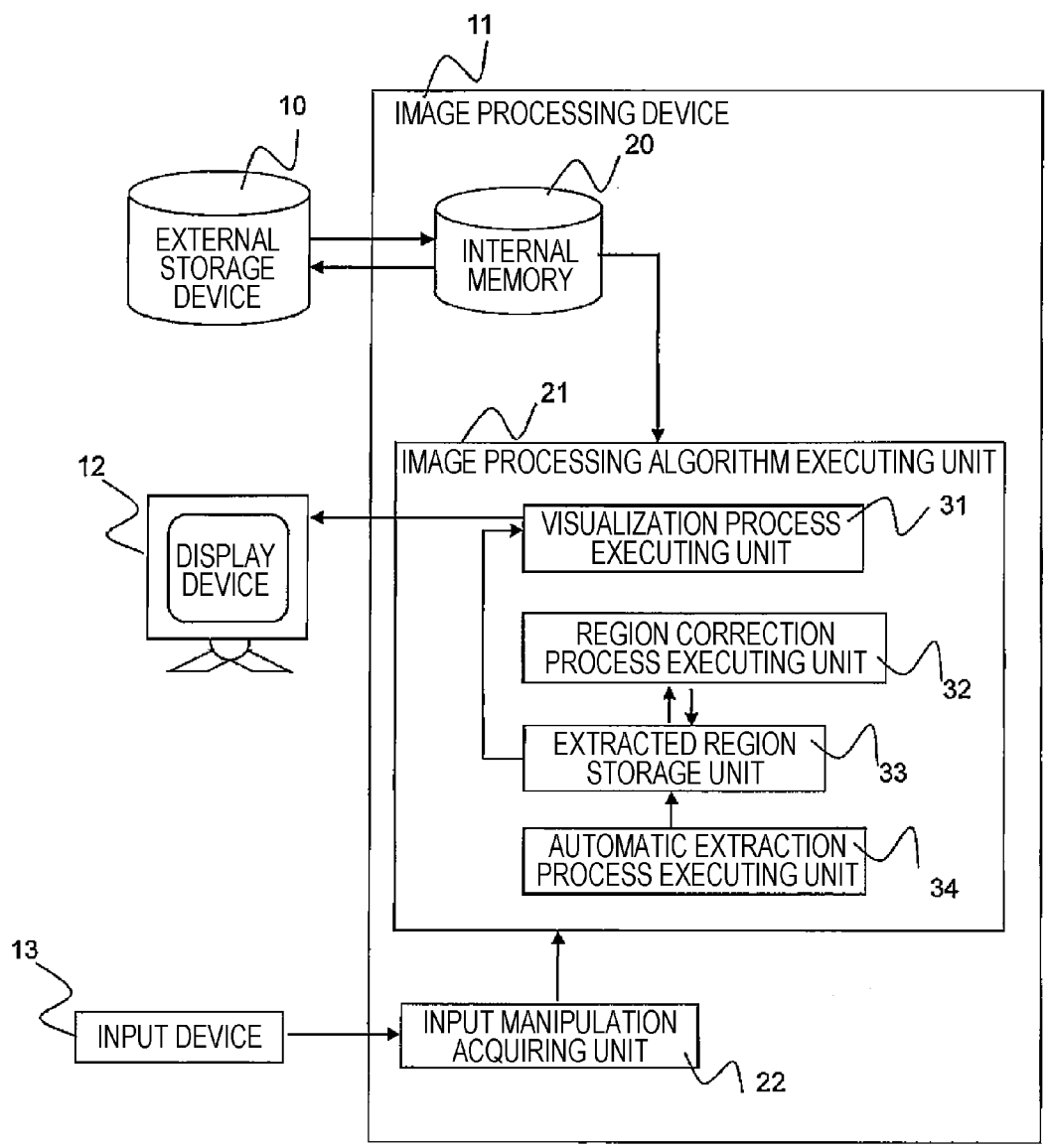
FIG. 1 is a system configuration diagram illustrating an example of the configuration of an image processing device.

FIG. 1 is a diagram illustrating an example of the configuration of an image processing device.

As illustrated in FIG. 1, a system includes an external storage device 10 that stores a 3-dimensional image (hereinafter also referred to as volume data) or data related to the 3-dimensional image, an image processing device 11 that executes image processing on the volume data captured and restructured by an X-ray CT device, an MRI device, or the like, a display device 12 that displays an image subjected to the image processing, and an input device 13 that inputs an instruction such as start of each process or a manipulation on a screen or an extraction result.

The image processing device 11 includes an internal memory 20 that stores the volume data or information related to the volume data, an image processing algorithm executing unit 21, an input manipulation acquiring unit 22. The image processing algorithm executing unit 21 is realized by program processing by a CPU (Central Processing Unit) or a dedicated circuit included in the image processing device 11. Further, the internal memory 20 and a storage unit (not illustrated) that stores a program for realizing the functions of the image processing device 11 are configured by a storage medium such as RAM (Random Access Memory), ROM (Read-Only Memory), an HDD (Hard Disk Drive), and flash memory.

The image processing algorithm executing unit 21 includes a visualization process executing unit 31 that executes a visualization process on the volume data and displays the volume data on the display device, an extracted region storage unit 33 that stores information regarding an extracted region, a region correction process executing unit 32 that performs a correction process on an automatically extracted region, and an automatic extraction process executing unit 34 that performs an automatic extraction process on the volume data.

An overall flow at the time of correction of an automatic extraction process result will be described with reference to FIG. 2.

First, a 3-dimensional automatic extraction region correction process is started in response to an input from the input device 13 or an instruction from the system (Step 40).

The volume data transmitted from the external storage device 10 to the internal memory 20 is input to the image processing algorithm executing unit 21, and then the automatic extraction process executing unit 34 executes the automatic extraction process on the input volume data (Step 41).

The automatic extraction process executed by the automatic extraction process executing unit 34 indicates, for example, a process of a region growing method or a LevelSet method. The region growing method mentioned here is a scheme of growing a region from a seed point equal to or greater than one voxel designated automatically or manually while determining whether adjacent voxels are suitable for a growing condition and of extracting a desired 3-dimensional region from the volume data. The LevelSet is a scheme of extracting a desired 3-dimensional region from the volume data by detecting a boundary plane of an object present within a 2-dimensional space through time evolution on a curved plane defined in a 3-dimensional space.

The extracted region storage unit 33 stores the 3-dimensional region (also referred to as an extracted region) automatically extracted in Step 41 first as an initial region (Step 42).

The visualization process executing unit 31 performs a visualization process on the initial region stored in the extracted region storage unit 33 (Step 43). The visualization process executing unit 31 uses a 3-dimensional visualization scheme, such as Multi Planar Reformat (MPR) of displaying a cross-sectional diagram of a defined cross-section such as Axial, Sagittal, or Coronal or any cross-section, or Curved Multi Planar Reformat (CMPR) of displaying a cross-sectional diagram of any curved plane, on the input volume data. A plurality of cross-sectional diagrams of a 3-dimensional image (3-dimensional region) expressed by the input volume data are consequently generated. At this time, the extracted 3-dimensional region can be visually viewed by differently coloring the 3-dimensional regions extracted by the automatic extraction process executing unit 34 and other regions in the input volume data.

In order to accurately confirm the extracted 3-dimensional region, it is important to confirm which voxels are extracted as the initial region on a cross-section (hereinafter also referred to as a slice). Thus, in Step 43, a method of displaying all of the voxels set as the initial region on a 2-dimensional plane is used in order to accurately comprehend a 3-dimensional shape on a 2-dimensional plane. Specifically, for example, there is a method of storing slices having the voxels included in the extracted region at the time of generating a plurality of slices from the input volume data by the visualization process executing unit 31, and outputting and displaying data of the stored slices by the display device 12. At this time, it is preferable that the voxels set as the extracted region in the displayed slice be colored. Also, there may be used a method of storing the cross-section including the voxels set as the extracted region among a plurality of cross-sections parallel to a plane generated by the CMPR and arbitrarily set, by the visualization process executing unit 31, and displaying the stored cross-section by the display device 12.

In the state displayed in this way, the extracted region is confirmed (Step 44). When regions of interest are extracted as the initial regions without excess or deficiency, the extraction process ends at this time point (Step 47).

When there is excess or deficiency, a process of correcting the displayed regions (for example, the initial regions) is performed (Step 45). Examples of the correction process used herein include a method of changing a parameter of the above-mentioned automatic extraction process and contour correction according a morphological process or a contour correction method. Here, a user does not correct a contour freely, but a region obtained by correcting luminance information of the initial region or the input volume data faithfully to some extent is set as a new extracted region. The new extracted region is stored as a corrected region in the extracted region storage unit 33.

The visualization process executing unit 31 executes the visualization process on the corrected region extracted in Step 45 in the same manner as that of Step 43 and displays the corrected region (Step 46).

Thereafter, Steps 44 to 46 are repeated, and then the extraction process ends when it is determined in Step 44 that the regions of interest are extracted without excess or deficiency (Step 47).

When a 3-dimensional region is displayed as a set of a plurality of 2-dimensional cross-section images, there are a plurality of 3-dimensional regions stored in the extracted region storage unit 33 and it is necessary to change display in a 3-dimensional region different from the currently displayed 3-dimensional region in some cases. For example, in the example of FIG. 2, the visualization display has been executed at the initial region, but a case in which a target of the visualization process is changed to the corrected region can be considered. In this case, when the angles of the cross-sections generated from the original volume data and the intervals between the slices are the same but the size of a 3-dimensional region instructed to be displayed is different from that of the currently displayed 3-dimensional region, the number of 2-dimensional cross-sections to be displayed may be different. Even in this case, the visualization process executing unit 31 automatically changes the number of 2-dimensional cross-sections to be displayed, and selects and displays a set of the 2-dimensional cross-sections so that the entire 3-dimensional region to be displayed can be covered. As described above, this is because whenever the visualization process executing unit 31 executes the visualization process, the slice including the extracted region is stored and the data of the stored slice is displayed. The details of a case in which a 3-dimensional region is displayed as a set of 2-dimensional cross-sections will be described with reference to FIG. 3. FIG. 3 is an image diagram illustrating an example of screen display displayed on the display device 12 through a 3-dimensional region visualization process executed by the visualization process executing unit 31. In FIG. 3, a hatched portion is the extracted region.

The left of FIG. 3 illustrates display of the initial regions. The initial regions cover three slices among the plurality of slices generated from the input volume data. Accordingly, data of the three slices are displayed.

Display of corrected regions 1 in the case in which correction is determined to be necessary in the confirmation executed in Step 44 is illustrated in FIG. 3. A case in which the size of the corrected region 1 in a slice direction is greater than that of the initial region is exemplified here. Since the corrected regions 1 each have a size which is greater than the initial region (that is, since corrected region 1 has a size greater than that of the initial region and covers five slices) by two slices, the number of slices to be automatically displayed is changed so that all of corrected regions 1 are displayed.

It is determined that it is necessary to correct the corrected regions 1, and then display of corrected regions 2 obtained through correction of the corrected regions 1 is illustrated on the right of FIG. 3. The size of the corrected region 2 is smaller than that of the corrected region 1 and the corrected region 2 covers four slices, and thus the number of displayed slices is reduced for display.

Here, when the display in Steps 43 and 46 is executed, a 3-dimensionally visualized image can also be displayed simultaneously for the purpose for comprehending the 3-dimensional shape on a 2-dimensional screen to some extent, in addition to the 2-dimensional slice display described above. Examples of a method of generating a 3-dimensionally visualized image include Volume Rendering (VR) of setting transparency from voxel values, adding light on the assumption of absorption and diffusion of the light with respect to voxels on each line of sight, and executing stereoscopic display and Maximum Intensity Projection (MIP) of projecting the maximum voxel value of the voxels on each line of sight. When the methods are used, an accurate shape and a rough 3-dimensional shape can be comprehended on one screen during the correction from the initial region.

Next, a specific example of the region correction process in Step 45 will be described. The initial region is an image extracted in a shape which is determined to be general and plausible in the pixels of the input volume data or its part, but another extracted shape may be desirable in some cases depending on image characteristics of the input volume data or a use scene of the system.

Here, a case in which a tumor produced in an organ having consistent CT values is extracted will be described as one example. In image diagnosis using a CT image, a contrast medium is used in many cases to distinguish a healthy substantial part of an organ from a lesion part such as a tumor on an image. The contrast medium is a specific medical agent injected into blood from a blood vessel. Since a time at which a contrast medium mixed in blood reaches a tumor is different from a time at which the contrast medium flows from the tumor to a substantial organ, the luminance of the tumor is known to be different from the luminance of the substantial organ depending on a time from the injection of the contrast medium to photography.

For example, as a tumor region extraction process executed on an image of which luminance is lower than that of a substantial organ, a portion with low luminance is generally extracted as a tumor. However, a portion with lower luminance is present in the tumor in some case depending on the property of a tumor. As the reason, for example, a case in which there is unevenness in expansion of a contrast medium in a tumor, a case in which a thrombus is present in a tumor, or a case in which a necrotic region is present in a tumor is considered. In this case, when an extraction process is executed by setting extraction of portions with low luminance as a basic algorithm, only regions with the lowest luminance are extracted as initial regions in many cases. In the case, however, only a region with the lowest luminance is not extracted, but a region with an intermediate value between a lowest luminance region and a high luminance region (substantial organ) as a pixel value is also preferably extracted as a tumor.

Figure 2:
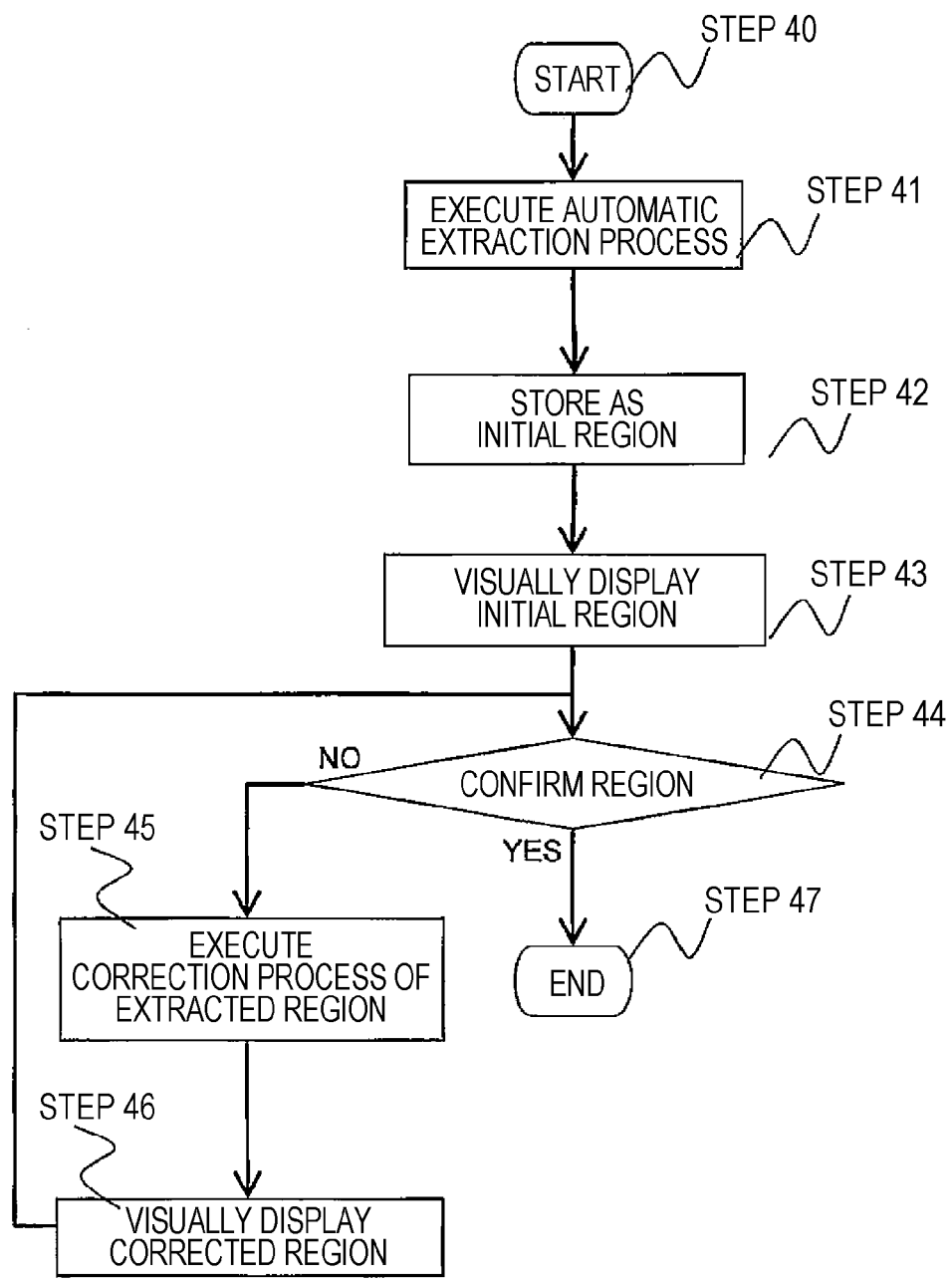
FIG. 2 is a flowchart illustrating an example of a region extraction and correction process executed by an image processing algorithm executing unit 21.
Figure 3:
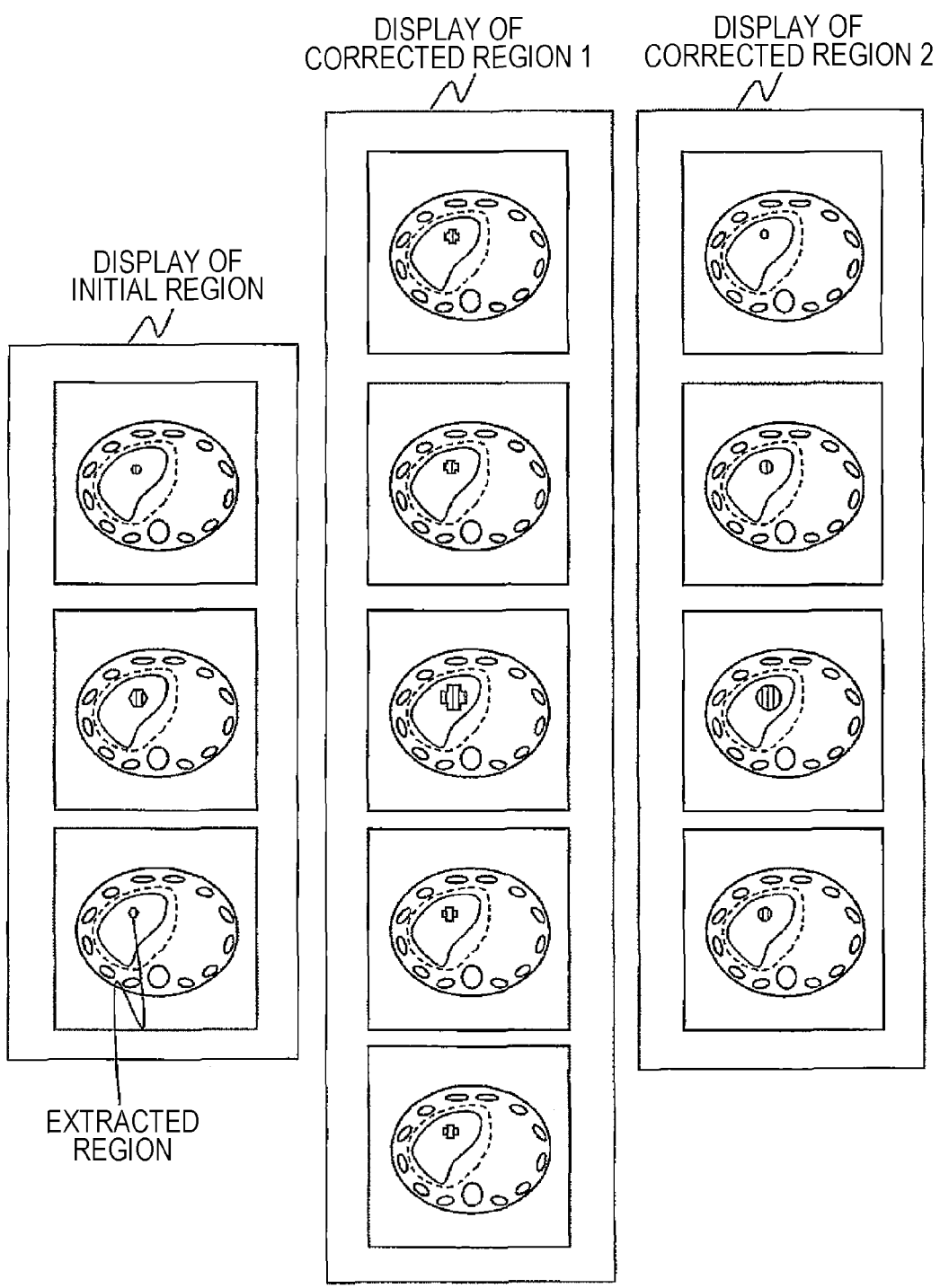
FIG. 3 is an image diagram illustrating an example of screen display displayed on a display device 12 by a 3-dimensional region visualization process executed by a visualization process executing unit 31.

According to the present scheme, a desired extracted region can be obtained by inputting the fact that there is excess or deficiency from the input device 13 at the time of the confirmation of the initial region (Step 44 of FIG. 2), extracting a next plausible region in the extracted region storage unit by the region correction executing unit (Step 45 of FIG. 2), and suggesting the extracted region to the visualization process executing unit 31 (Step 46 of FIG. 2). An example of this correction process will be described with reference to FIG. 4.

FIG. 4 is an image diagram illustrating an example in which the initial region extracted by the automatic extraction process executing unit 34 is corrected by changing a parameter of an extraction algorithm by the region correction process executing unit 32.

Here, an image with luminance on FIG. 4 is assumed to be an input image. For the description, regions 1, 2, and 3 are assumed to have single luminance in the respective regions, and an automatic extraction algorithm is assumed to be an algorithm in which a region with luminance lower than preset luminance is set as an extracted region through a binarization process using a threshold value. Here, it is assumed that the regions 1, 2, and 3 are configured by voxels with luminance 1, luminance 2, and luminance 3, respectively, and the luminance 1 is greater than the luminance 2 and the luminance 2 is greater than the luminance 3.

When a preset initial threshold value is greater than the region 3 and is less than the region 2, only the region 3, that is, an initial region A, is extracted as the result of the automatic extraction process, as illustrated on the lower left of FIG. 4. For example, when it is assumed that the region 2 is the entire region of an organ, the region 3 is the region of a lesion part, and the lesion part is extracted for the purpose of a process, a target region is extracted without excess or deficiency in regard to the initial region A. Thus, the process ends here. However, when the region 1 is shown as a part of an organ and the regions 2 and 3 are lesion parts, the initial region A is extracted merely as a part of the lesion part. Therefore, it is necessary to execute a region correction process. Accordingly, a parameter of an extraction algorithm is changed in order to extract a plausible region as a next extraction result of the initial region A. That is, since the extraction algorithm is here a binarization process using a threshold value, by changing the initial threshold value to a correction threshold value A greater than the luminance 2 and less than the luminance 1, a corrected region B illustrated on the lower right of FIG. 4 can be obtained, and thus a target region can be extracted without excess or deficiency.

The change in the luminance can be continued more than three stages. By inputting the fact that there is excess or deficiency at the time of the confirmation of the corrected region, it is possible to cope with the change in luminance even more than three stages.

Also, the generation of the corrected region and the storage in the region storage unit may be all executed before display of the initial region, may be executed in parallel to the display process, or may be executed after the fact that there is excess or deficiency is input. As the extraction of the next plausible region of the initial region, for example, there is a method of changing a parameter of the extraction algorithm used at the time of the extraction of the initial region and setting a region boundary on the further outer side. Since the corrected region is generated based on the initial region, the extraction process can be completed in a shorter time than a time when a process of extracting a plurality of regions is executed. Of course, the extraction process is also applicable even when an extraction target region has luminance higher than that of its periphery region.

As a method of setting the correction threshold value, a method may be used in which a region correction process executing unit has a parameter table illustrated in FIG. 5 in advance and a threshold value may be set with reference to the parameter table, or a method may be used in which a parameter is used in the form of a formula to set a correction threshold value, as in an example of a parameter table illustrated in FIG. 6. Here, f1, f2, f3, f'1, f'2, f'3, . . . are any preset functions, and "f1=f'1, f2=f'2, f3=f'3, . . . " may be set or the functions may be individually set.

Otherwise, parameters themselves are not defined, but an algorithm execution result may be retained as a table. For example, FIG. 7 illustrates an example of a correction process item table. A convergence condition is determined, for example, when all of the correction items are satisfied with reference to the correction item table set in this way, when one of the correction items is satisfied, or when a number equal to or greater than a given number of condition items is satisfied.

Next, a case will be described in which not an extraction region in the form faithful to luminance but an extraction region in the form screening the luminance is required. That is, correct extraction can be executed in the range of a region of interest, but a form close to a sphere or a more smooth extraction shape is preferable depending on its use scene in some cases. In this case, an extraction algorithm or parameters thereof is not changed, but a shape is gradually changed and displayed in a form which does not considerably depart from the initial region. That is, approximation using polygonal approximation or discrete sine transform is executed on a region contour or a method of forming a smooth contour using a morphological filter is used. A method of changing parameters according to one scheme is used, or a plurality of contours are generated by applying a plurality of schemes and likelihood is considered to be different depending on an application scene. However, as one method of a general case, there is exemplified a method of setting an order of changing a form from a form closest to an initial region to a 3-dimensional geometric figure such as a sphere step by step as far as possible along a plausibility decreasing axis. The decrease in the plausibility is defined in advance as a rule and the region correction is executed such that the shape of an extracted region is changed according to the rule.

Here, a case in which the decrease in the plausibility is defined as an order of changing a region shape from an initial region to an oval sphere will be exemplified specifically. First, an initial region is extracted through an automatic extraction scheme. The automatic extraction scheme herein may use the above-described region growing method or an algorithm such as LevelSet, or may be a scheme such as a binarization process using a threshold value depending on characteristics of an image.

An algorithm of filling a blank portion of the region inside of corrected region of the initial region obtained in this way is first considered. A case in which a morphological filter or the like is used will be described as an example of the algorithm for the filling with reference to FIG. 8.

Figure 8:
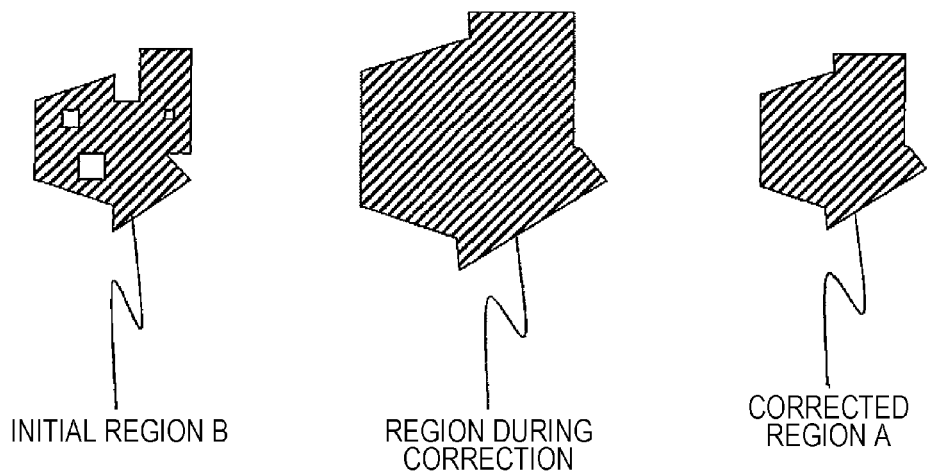
FIG. 8 is an image diagram illustrating examples of regions corrected by the region correction process executing unit 32 from initial regions extracted by the automatic extraction process executing unit 34, including a correction procedure.

FIG. 8 is an image diagram illustrating example of regions corrected by the region correction process executing unit 32 from initial regions extracted by the automatic extraction process executing unit 34, including a correction procedure. First, a Dilation process is executed until blank portions inside an initial region B illustrated on the left of FIG. 8 are filled. The Dilatiob process is a process of growing a region contour pixel by pixel. A state in which the blank portions inside the initial region B are all filled through this process is illustrated as a region during correction in the middle of FIG. 8. Thereafter, a region obtained by executing an Erosion process by the same number as the number of times the Dilation process is executed is illustrated as a corrected region A on the right of FIG. 8. The Erosiob process is a process of executing a reverse manipulation of the Dilation process and is a process of contracting the contour of a region pixel by pixel. The corrected region A in which the blank portions inside the initial region B are all filled in this way is generated and this corrected region is displayed here as the next plausible region of the initial region B.

Figure 9:
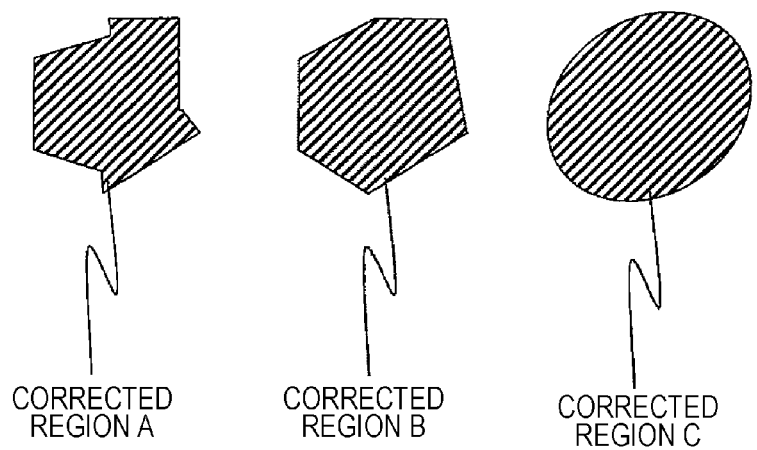
FIG. 9 is an image diagram illustrating examples of a plurality of corrected regions corrected by the region correction process executing unit 32.

An example of a method of approximating a corrected region A to a more oval sphere will be described with reference to FIG. 9. FIG. 9 is an image diagram illustrating examples of a plurality of corrected regions corrected by the region correction process executing unit 32. A region obtained by replacing a concave portion of the contour of a corrected region A illustrated on the left of FIG. 9 with a straight line is a corrected region B in the middle of FIG. 9, and an ellipse in which the major diameter and the minor diameter of an ellipse of the initial region are set to the long axis and the short axis is a corrected region C on the right of FIG. 9. In this way, the corrected region is changed in the order of the corrected region A→the corrected region B→the corrected region C. Also, the description in FIGS. 4, 8, and 9 has been made on the assumption that an extracted region is a 2-dimensional region. However, even when an extracted region is a 3-dimensional region, a corrected region can be generated according to the same algorithm.

REFERENCE SIGNS LIST 10 external storage device
11 image processing device
12 display device
13 input device
20 internal memory
21 image processing algorithm executing unit
22 input manipulation acquiring unit
31 visualization process executing unit
32 region correction process executing unit
33 extracted region storage unit
34 automatic extraction process executing unit

The invention claimed is:

1. An image processing device executing image processing on volume data of a 3-dimensional image, the image processing device comprising:
   an extraction process executing unit that extracts a 3-dimensional initial region satisfying a condition given in advance from the volume data;
   a region correction process executing unit that extracts a 3-dimensional corrected region by performing a correction process on the initial region; and
   a visualization process executing unit that generates a plurality of cross-sectional diagrams of the 3-dimensional image from the volume data and outputs at least some of the plurality of cross-sectional diagrams,
   wherein when the initial region is displayed, the visualization process executing unit selects one or more cross-sectional diagrams having voxels included in the initial region from the plurality of cross-sectional diagrams generated by the visualization process executing unit, and outputs the selected one or more cross-sectional diagrams so that the voxels included in the initial region are distinguishable from other regions,
   when the corrected region is displayed, the visualization process executing unit selects one or more cross-sectional diagrams having voxels included in the corrected region from the plurality of cross-sectional diagrams generated by the visualization process executing unit, and outputs the selected one or more cross-sectional diagrams so that the voxels included in the corrected region are distinguishable from other regions, and
   wherein, when the corrected region is displayed after the initial region has been displayed and a first number of cross-sectional diagrams having voxels included in the initial region is different from a second number of cross-sectional diagrams having voxels included in the corrected region, the visualization process executing unit changes a number of cross-sectional diagrams to be output from the first number to the second number.

2. The image processing device according to claim 1, wherein, when the corrected region is displayed after the display of the initial region and 3-dimensional regions of the initial region and of the corrected region are different in size, the visualization process executing unit changes the number of cross-sectional diagrams to be output from the first number to the second number.

3. The image processing device according to claim 1, wherein the region correction process executing unit extracts the corrected region by changing a parameter given as the condition.

4. The image processing device according to claim 1, wherein the region correction process executing unit extracts the corrected region so that the region is changed in accordance with a rule determined in advance.

5. The image processing device according to claim 1, wherein the region correction process executing unit extracts the corrected region by correcting a contour of the initial region.

6. A method of executing image processing on volume data of a 3-dimensional image by an image processing device, the method comprising:
   extracting a 3-dimensional initial region satisfying a condition given in advance from the volume data by an extraction process executing unit of the image processing device;
   extracting a 3-dimensional corrected region by performing a correction process on the initial region by a region correction process executing unit of the image processing device;
   generating a plurality of cross-sectional diagrams of the 3-dimensional image from the volume data by a visualization process executing unit of the image processing device;
   selecting one or more cross-sectional diagrams having voxels included in the initial region from the plurality of cross-sectional diagrams generated by the visualization process executing unit, and outputting the selected one or more cross-sectional diagrams so that the voxels included in the initial region are distinguishable from other regions by the visualization process executing unit; and
   selecting one or more cross-sectional diagrams having voxels included in the corrected region from the plurality of cross-sectional diagrams generated by the visualization process executing unit, and outputting the selected one or more cross-sectional diagrams so that the voxels included in the corrected region are distinguishable from other regions by the visualization process executing unit,
   wherein, when the corrected region is displayed after the display of the initial region and a first number cross-sectional diagrams having the voxels included in the initial region is different from a second number of cross-sectional diagrams having the voxels included in the corrected region, the visualization process executing unit changes a number of cross-sectional diagrams to be output from the first number to the second number.

7. The method according to claim 6, wherein, when the corrected region is displayed after the display of the initial region and 3-dimensional regions of the initial region and the corrected region are different in size, the visualization process executing unit changes the number of cross-sectional diagrams to be output from the first number to the second number.

8. The method according to claim 6, wherein the region correction process executing unit extracts the corrected region by changing a parameter given as the condition.

9. The method according to claim 6, wherein the region correction process executing unit extracts the corrected region so that the region is changed in accordance with a rule determined in advance.

10. The method according to claim 6, wherein the region correction process executing unit extracts the corrected region by correcting a contour of the initial region.

* * * * *